United States Patent
Küpper

(10) Patent No.: US 7,204,611 B2
(45) Date of Patent: Apr. 17, 2007

(54) LAMP WITH COATING REFLECTING MIDDLE INFRARED AND TRANSMITTING NEAR INFRARED

(75) Inventor: Lukas Küpper, Aachen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 10/538,112

(22) PCT Filed: Dec. 4, 2003

(86) PCT No.: PCT/IB03/05599

§ 371 (c)(1),
(2), (4) Date: Jun. 8, 2005

(87) PCT Pub. No.: WO2004/053925

PCT Pub. Date: Jun. 24, 2004

(65) Prior Publication Data

US 2006/0098431 A1     May 11, 2006

(30) Foreign Application Priority Data

Dec. 12, 2002  (EP) .................... 02102736

(51) Int. Cl.
*F21V 14/00* (2006.01)

(52) U.S. Cl. ............... 362/255; 362/293; 362/510; 362/543; 313/112; 313/113; 313/114

(58) Field of Classification Search ............ 362/543, 362/255, 293, 510; 313/112–114
See application file for complete search history.

(56) References Cited

U.S. PATENT DOCUMENTS

| 4,734,614 A | * | 3/1988 | Kuus ................... 313/112 |
| 4,774,396 A | | 9/1988 | Salit et al. |
| 6,404,112 B1 | | 6/2002 | Frings |
| 2002/0063503 A1 | * | 5/2002 | Tsuda et al. ........... 313/113 |

FOREIGN PATENT DOCUMENTS

| DE | 10027018 A1 | | 5/2000 |
| EP | 418784 | | 3/1991 |
| JP | 07220692 A | * | 8/1995 |
| JP | 10 268129 | | 1/1999 |

* cited by examiner

*Primary Examiner*—Sandra O'Shea
*Assistant Examiner*—Meghan K. Dunwiddie

(57) ABSTRACT

A lamp for night sight applications includes a bulb that transmits both visible and infrared light. The lamp also includes a coating that reflects middle infrared radiation and is transparent to near infrared radiation to increase output efficiency in the near infrared spectral range. There may be a second coating that blocks visible light on part of the lamp—and the second coating may be on an external bulb, while the first coating is on an internal bulb. The lamp is preferably used as a vehicle headlamp with a reflector that reflects near infrared radiation and is transparent to visible light. The second coating and reflector may be on the lower part of the lamp.

8 Claims, 6 Drawing Sheets

LAMP WITH COATING REFLECTING MIDDLE INFRARED AND TRANSMITTING NEAR INFRARED

The invention relates to a lamp with a bulb that generates visible light and infrared light.

A lamp of this kind is known as a light source from DE 100 27 018 A1, and is used in a headlamp. The vehicle headlamp is equipped with a reflector, a lens and a shield, and operates in accordance with the projection principle. Light emitted by the lamp is reflected by the reflector. The shield and the lens are arranged in the beam path of a reflected light bundle. In the dipped operational position, the light bundle emitted from the headlamp in the visible wavelength range is a dipped-beam light bundle and illuminates a near range. The shield is at least partially permeable, at least over areas, to light in the infrared wavelength range. The light in the infrared wavelength range emitted through the shield is a main-beam light bundle, and illuminates a far range. The far range is registered by a sensor device and displayed for the vehicle driver by means of a display device.

It is an object of the invention to increase the output efficiency of a lamp for illuminating a far range with infrared light.

This object is achieved in accordance with the features of a lamp having a bulb that generates visible light and infrared light, the bulb having a coating that reflects middle infrared radiation and is transparent to near infrared radiation. In accordance with the invention, the lamp bulb is equipped with a coating that reflects middle infrared radiation and is transparent to near infrared radiation. Infrared radiation is divided into near infrared radiation and middle infrared radiation. The filament is heated with the reflected middle infrared radiation, so the output efficiency of the lamp is increased. The near infrared radiation is emitted into a near range and a far range, and used for night-vision applications. The near and far ranges are hereby recorded by a sensor device and displayed for the vehicle driver by means of a display device. It is assumed that the sensor device requires essentially near infrared radiation but not middle infrared radiation for the purpose of the display.

In an advantageous manner, the lamp bulb has an elliptical shape. Owing to the elliptical shape, the middle infrared radiation is reflected evenly by the coating onto the filament.

In a simple manner, the coating has an interference coating with 37 individual layers of $Nb_2O_5$ and $SiO_2$.

In an advantageous manner, the lamp bulb is equipped with a coating that eliminates visible light. An unintentional dazzling of passers-by or oncoming traffic is thereby prevented.

In an advantageous manner, the lamp is equipped with an external bulb with the coating that eliminates visible light. The coating that eliminates visible light can be applied to an additional bulb in a simple manner.

In a simple manner, the coating is equipped with $Fe_2O_3$ and $SiO_2$ layers.

In an advantageous manner, the coating is arranged in a lower area of the bulb. The coating thereby acts as a barrier, which is arranged in a beam path to a lower reflector segment. The near and far ranges are illuminated with the near infrared radiation, and simultaneously, a dipped-beam light bundle is generated with visible light which illuminates a near range without oncoming traffic being dazzled.

In an advantageous manner, a lower reflector segment is equipped with an interference coating which reflects near infrared radiation and which is transparent to visible light. The lamp used in the headlight emits both near infrared radiation and visible light. The visible light is absorbed in the lower reflector segment. Visible light is thereby prevented in the far range, and oncoming traffic is not dazzled. The lamp itself is equipped with only one coating, which reflects middle infrared radiation and is permeable to near infrared radiation.

The invention will be further described with reference to examples of embodiments shown in the drawings, to which, however, the invention is not restricted.

Figure 1:
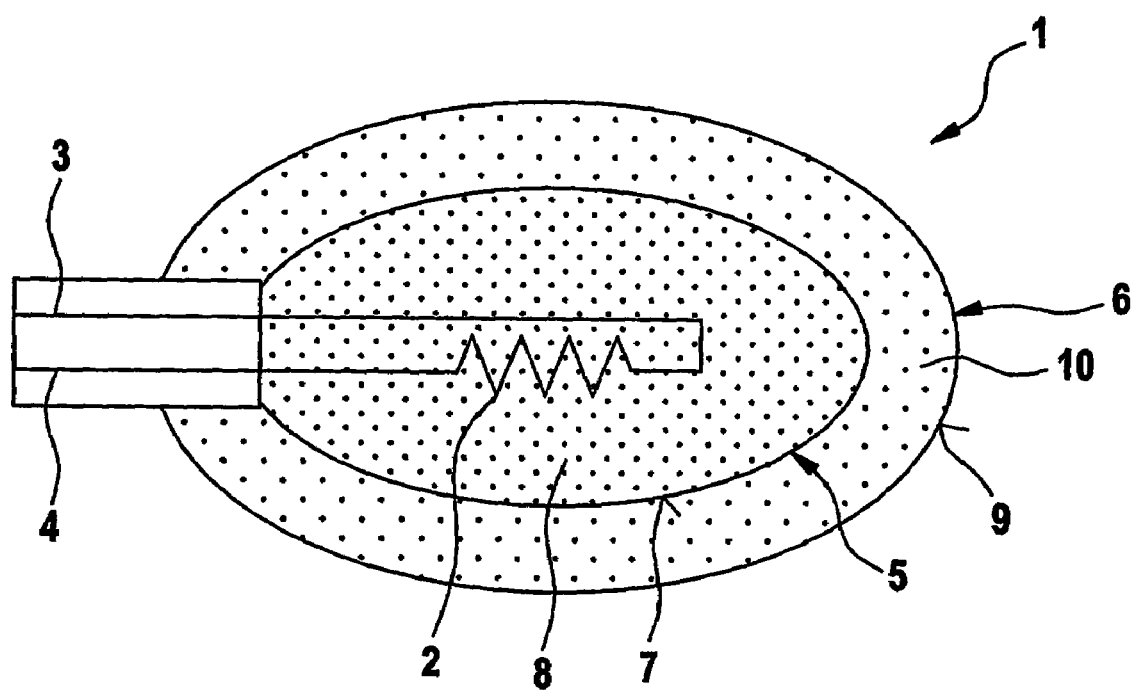
FIG. 1 shows a lamp with an internal and an external bulb for generating an infrared main-beam and dipped-beam light bundle in schematic sectional view.

FIG. 1 shows a lamp 1 with a filament 2, electrically conductive feed wires 3 and 4, an internal bulb 5 and an external bulb 6. Applied to an external surface 7 of the internal bulb 5 is a coating 8, which reflects middle infrared radiation and allows near infrared radiation to pass through. The coating 8, which is applied to the elliptical internal bulb 5, reflects middle infrared radiation onto the filament 2 in order to increase the efficiency of the lamp.

The coating 8 is equipped with a total of 37 layers, specifically, starting from the surface of the lamp bulb, a first 170.94 nm thick layer of $Nb_2O_5$, then a second 189.40 nm thick layer of $SiO_2$, then a third 133.29 nm thick layer of $Nb_2O_5$, a fourth 229.68 nm thick layer of $SiO_2$, a fifth 146.3 nm thick layer of $Nb_2O_5$, a sixth 258.26 nm thick layer of $SiO_2$, a seventh 167.24 nm thick layer of $Nb_2O_5$, an eighth 242.48 nm thick layer of $SiO_2$, a ninth 152.63 nm thick layer of $Nb_2O_5$, a tenth 280.44 nm thick layer of $SiO_2$, an eleventh 205.76 mn thick layer of $Nb_2O_5$, a twelfth 304.82 nm thick layer of $SiO_2$, a thirteenth 226.07 nm thick layer of $Nb_2O_5$, a fourteenth 277.54 nm thick layer of $SiO_2$, a fifteenth 172.17 nm thick layer of $Nb_2O_5$, a sixteenth 357.67 nm thick layer of $SiO_2$, a seventeenth 210.09 nm thick layer of $Nb_2O_5$, an eighteenth 348.82 nm thick layer of $SiO_2$, a nineteenth 180.54 nm thick layer of $Nb_2O_5$, a twentieth 509.90 nm thick layer of $SiO_2$, a twenty-first 152.30 nm thick layer of $Nb_2O_5$, a twenty-second 519.34 nm thick layer of $SiO_2$, a twenty-third 145.95 nm thick layer of $Nb_2O_5$, a twenty-fourth 506.86 nm thick layer of $SiO_2$, a twenty-fifth 163.68 nm thick layer of $Nb_2O_5$, a twenty-sixth 447.11 nm thick layer of $SiO_2$, a twenty-seventh 183.42 nm thick layer of $Nb_2O_5$, a twenty-eighth 443.45 nm thick layer of $SiO_2$, a twenty-ninth 170.87 nm thick layer of $Nb_2O_5$, a thirtieth 518.88 mm thick layer of $SiO_2$, a thirty-first 153.59 nm thick layer of $Nb_2O_5$, a thirty-second 573.54 nm thick layer of $SiO_2$, a thirty-third 387.73 nm thick layer of $Nb_2O_5$, a thirty-fourth 557.49 nm thick layer of $SiO_2$, a thirty-fifth 165.28 mm thick layer of $Nb_2O_5$, a thirty-sixth 543.59 nm thick layer of $SiO_2$, and a thirty-seventh 379.59 nm thick layer of $Nb_2O_5$.

Applied to an external surface 9 of the elliptical external bulb 6 is a second coating 10, which eliminates visible light so that the lamp 1 illuminates a near and a far range with near infrared light. The near and far range can then be viewed using a night-vision device.

The second coating is equipped with a total of twelve layers, specifically, starting from a surface of the lamp bulb, a first 38.82 nm thick layer of $Fe_2O_3$, then a second 99.9 nm thick layer of $SiO_2$, then a third 47.06 nm thick layer of $Fe_2O_3$, a fourth 102.39 nm thick layer of $SiO_2$, a fifth 228.8 mm thick layer of $Fe_2O_3$, a sixth 97.78 nm thick layer of $SiO_2$, a seventh 58.95 mm thick layer of $Fe_2O_3$, an eighth 100.39 nm thick layer of $SiO_2$, a ninth 52.29 nm thick layer of $Fe_2O_3$, a tenth 97.97 nm thick layer of $SiO_2$, an eleventh 223.1 nm thick layer of $Fe_2O_3$, and a twelfth 194.75 nm thick layer of $SiO_2$.

Figure 2:
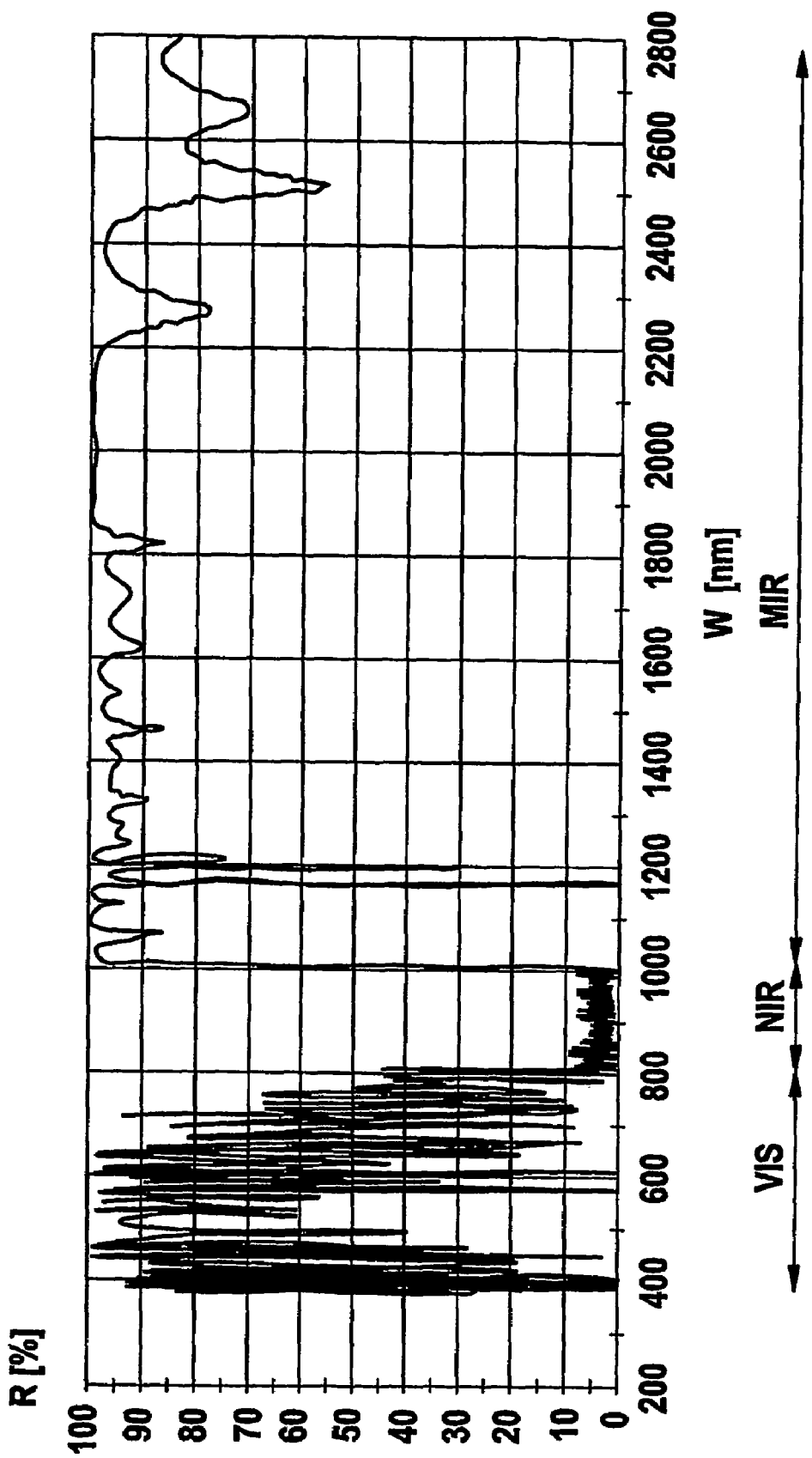
FIG. 2 shows a diagram in which a reflection of a coating is plotted against a wavelength.

FIG. 2 shows a diagram in which a reflection of the first coating 8 is plotted against a wavelength. The coating 8 is permeable to near infrared radiation, NIR for short, lying within a range of 800 to 1000 nm, and reflective of middle infrared radiation, MIR for short, lying within a range of 1000 nm and above. The coating 8 is permeable, at least in part, to visible light.

Figure 3:
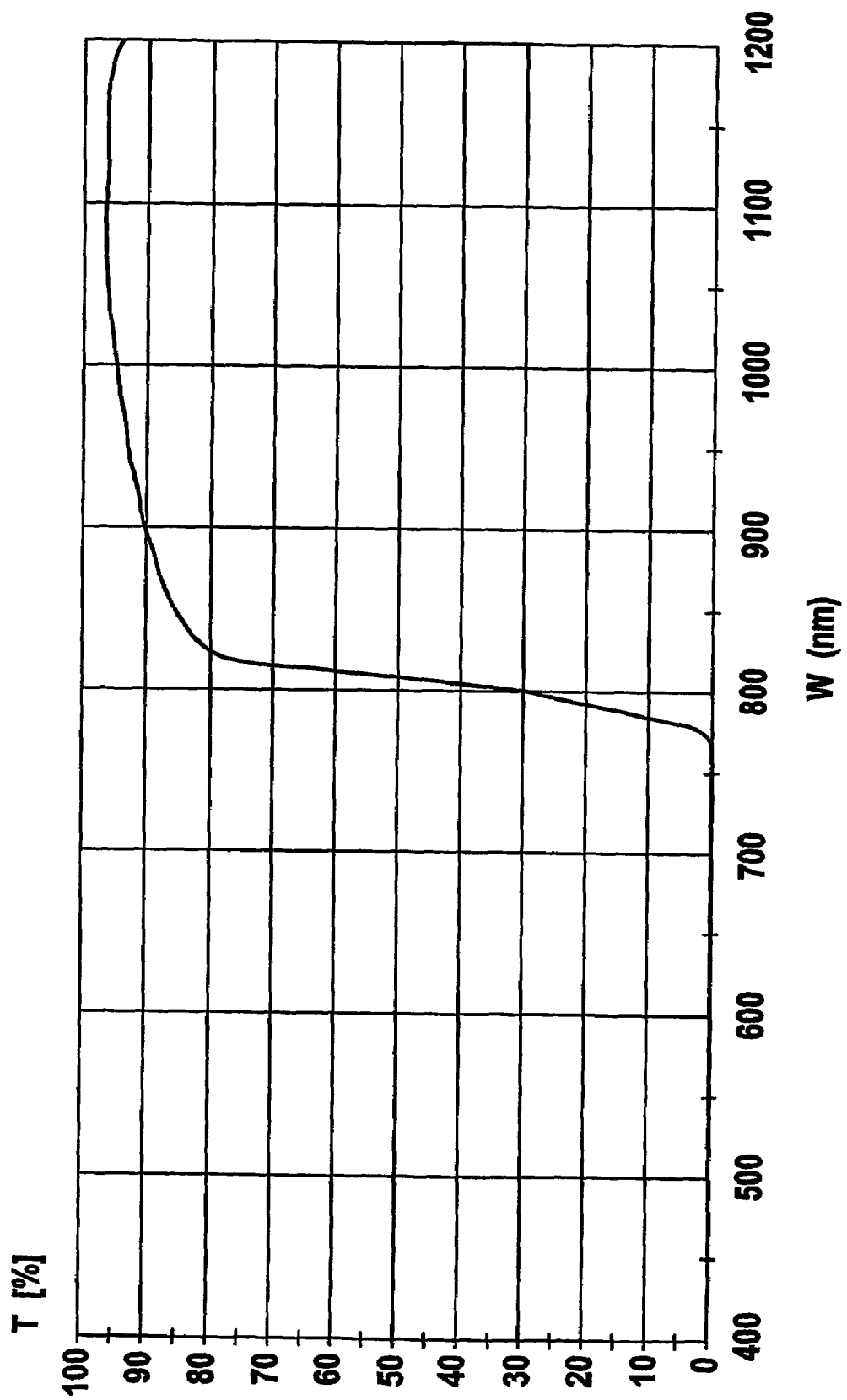
FIG. 3 shows a diagram in which a transmission of a coating that blocks visible light and allows infrared light through, is plotted against a wavelength.

FIG. 3 shows a diagram in which a transmission of the second coating 10 is plotted against a wavelength. The coating absorbs visible light, VIS for short, lying within a range of 400 to 800 nm, and is permeable to near and middle infrared radiation.

Figure 4:
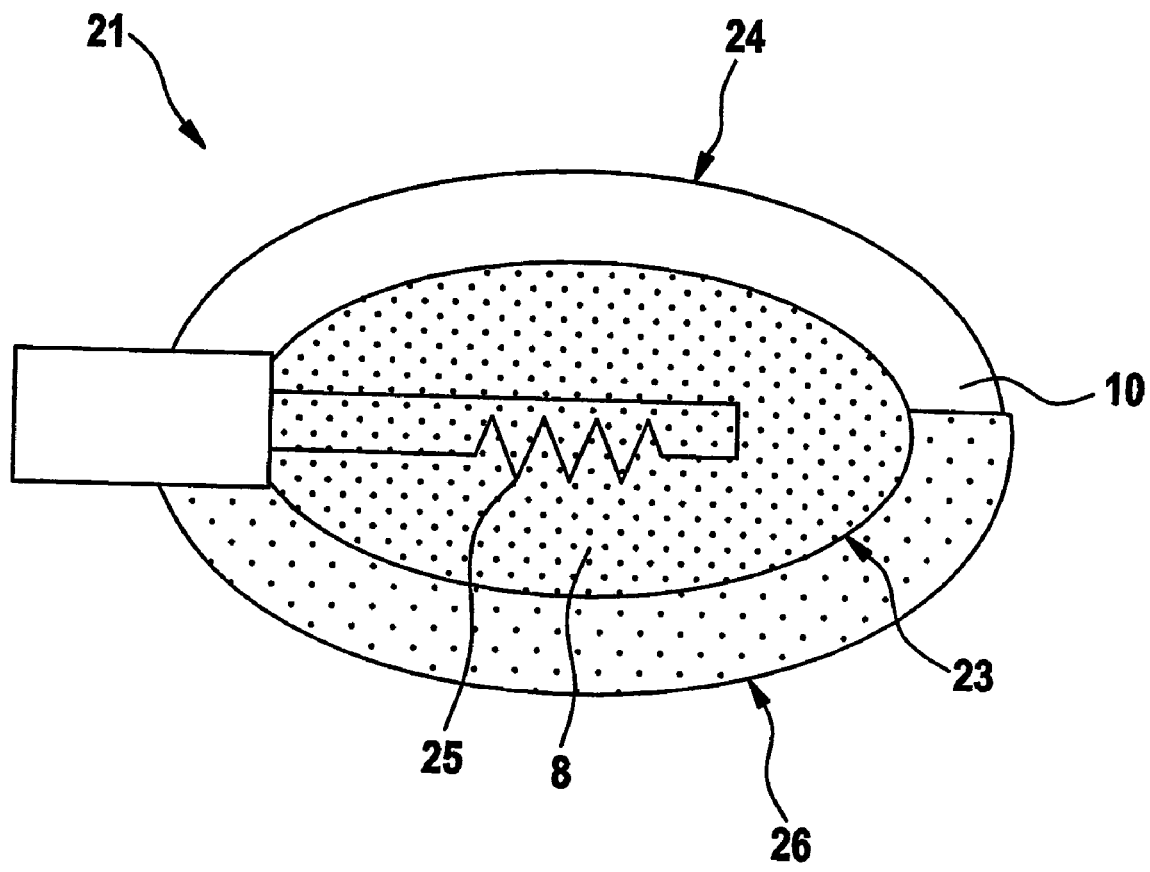
FIG. 4 shows a second lamp with an internal and an external bulb for generating an infrared main-beam light bundle and a visible dipped-beam light bundle in schematic sectional view.
Figure 5:
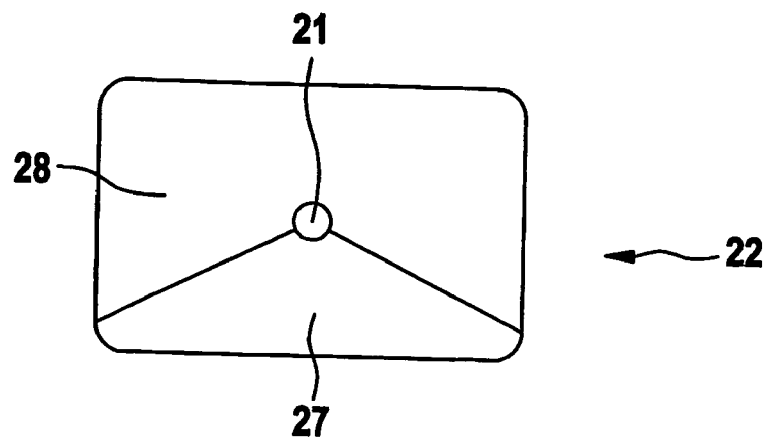
FIG. 5 shows the lamp as used in a reflector.

FIGS. 4 and 5 show a second lamp 21, used in a reflector 22. The lamp 21 is equipped with an internal bulb 23 and an external bulb 24, which is partially coated. The internal bulb is equipped with the coating 8, which reflects middle infrared radiation back onto the filament 25 so that the filament 25 is additionally heated. The coating 8 is permeable to near infrared radiation. The external bulb 24 is equipped with the coating 10 in a lower bulb area 26. The coating 10 eliminates visible light and is permeable only to near infrared radiation. This near infrared radiation falls upon a lower reflector segment 27, which emits the near infrared radiation as a main-beam light bundle into a far range.

In other words: in order to generate near infrared light bundles and a visible dipped-beam light bundle, a lamp 21 is used, which is partially enclosed by a barrier 10, which is permeable to infrared light and blocks visible light. This barrier 10 is arranged, as a partial coating 10, on the glass bulb 24 which envelops the lamp 21, in a beam path between the filament 25 and the lower reflector segment 27, and filters out visible light, so that only a near-infrared main-beam light bundle is generated by the lower reflector segment 27. An upper reflector segment 28 serves to generate the visible dipped-beam light bundle. The lamp 21 and the reflector 22 are component parts of a headlamp 21, 22.

Figure 6:
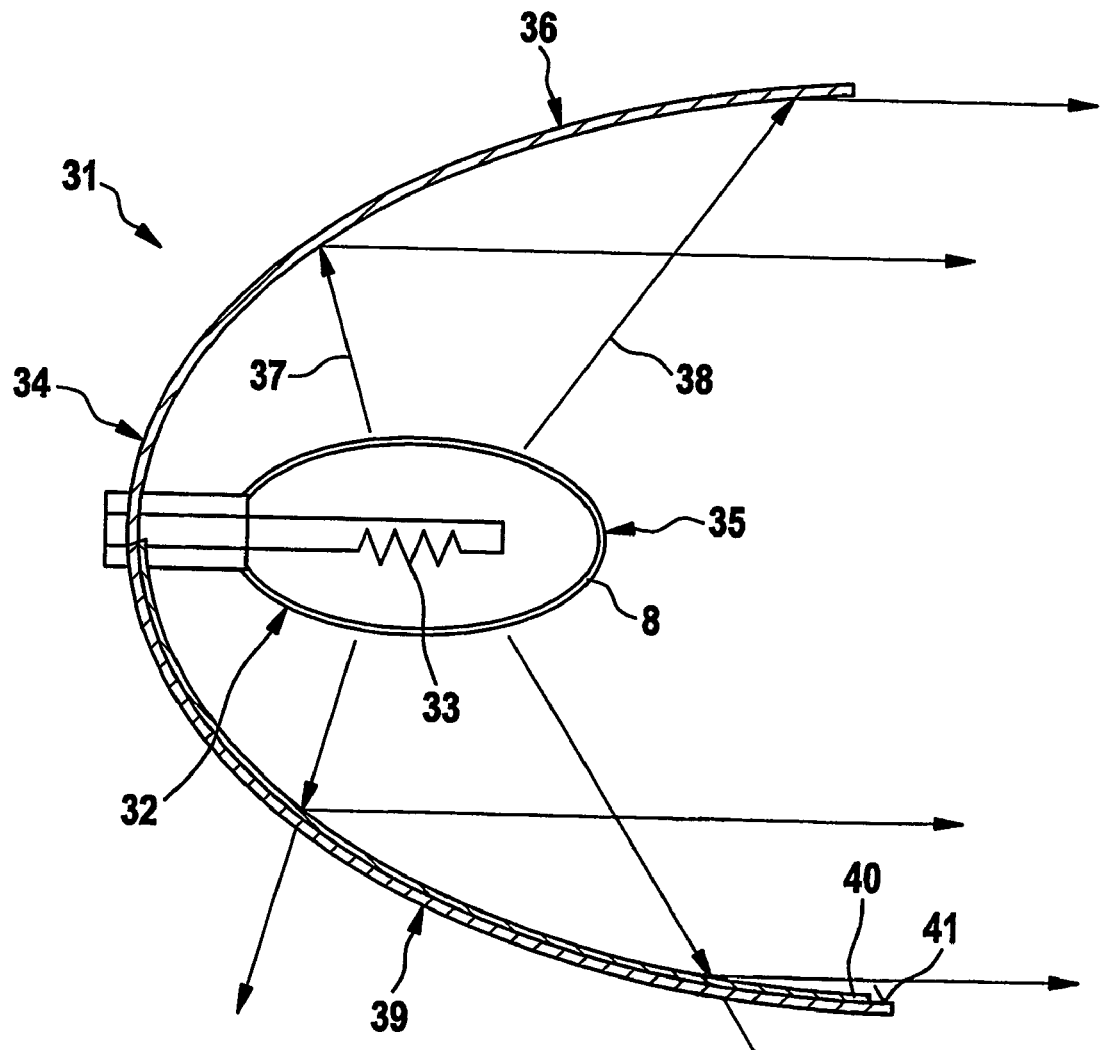
FIG. 6 shows a headlamp with a third lamp and a second reflector in schematic sectional view.
Figure 7:
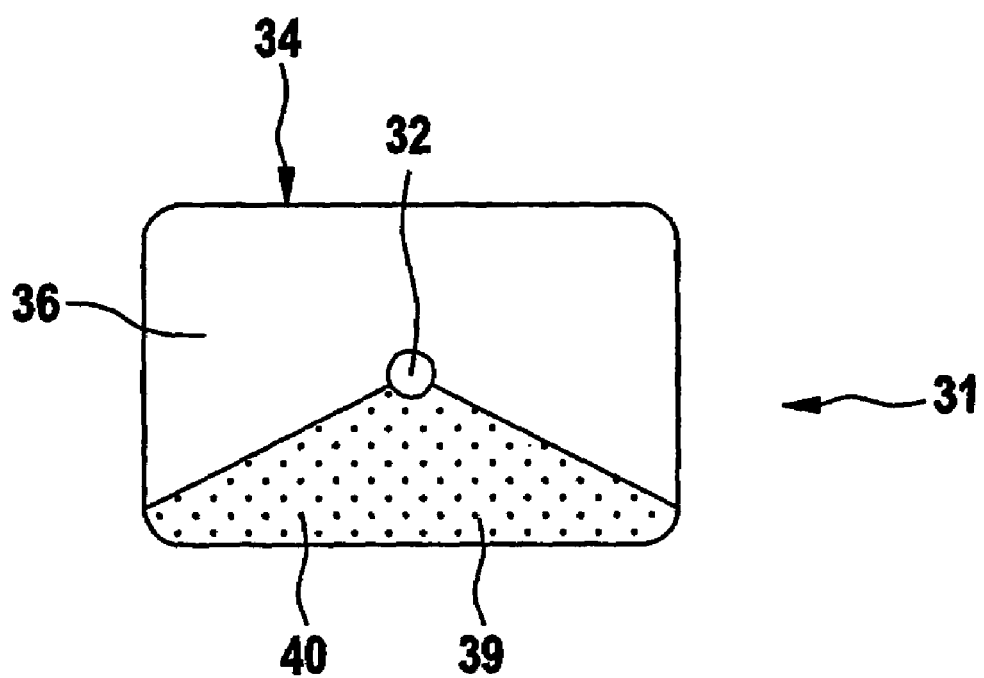
FIG. 7 shows the headlamp in schematic plan view.

FIGS. 6 and 7 show a headlamp 31 with a lamp 32 whose filament 33 is arranged in a focal point of a reflector 34. The lamp 32 is equipped, on a lamp bulb 35, with the coating 8, which is permeable to visible light and near infrared radiation, and reflects middle infrared radiation back onto the filament 33. A beam 37 and 38 falling onto an upper reflector segment 36 generates a visible dipped-beam light bundle 37 and 38, which additionally includes near infrared radiation. A lower reflector segment 39 is equipped with an interference coating 40, which reflects near infrared radiation and absorbs visible light. The reflector segment 39 ensures an elliptical distribution of the near infrared radiation in a plane parallel to the road and is thus optimized for a night-vision application. As an alternative, a coating 40, which is permeable to visible light and reflects infrared radiation, is arranged on a surface 41 of a lower reflector segment 39 that has been optimized for infrared illumination.

LIST OF REFERENCE NUMBERS

1 Lamp
2 Filament
3 Electrically conductive feed wire
4 Electrically conductive feed wire
5 Internal bulb
6 External bulb
7 Surface
8 Coating
9 Surface
10 Coating
11
12
13
14
15
16
17
18
19
20
21 Lamp
22 Reflector
23 Internal bulb
24 External bulb
25 Filament
26 Lower area
27 Reflector segment
28 Reflector segment
29
30
31 Headlamp
32 Lamp
33 Filament
34 Reflector
35 Bulb
36 Reflector segment
37 Beam
38 Beam
39 Reflector segment
40 Coating
41 Surface
42
43
44
45
46
47
48
49
50
51
52
53
54
55
56
57
58
59
60
61
62

The invention claimed is:
1. A lamp comprising a bulb that generates visible light and infrared light, wherein the bulb is provided with a coating that reflects middle infrared radiation and is transparent to near infrared radiation and the coating comprises an interference coating with 37 individual layers of $Nb_2O_5$ and $SiO_2$.

2. A lamp comprising a bulb that generates visible light and infrared light, the bulb being provided with a first coating that reflects middle infrared radiation and is transparent to near infrared radiation and provided with a second coating that eliminates visible light wherein the second coating comprises $Fe_2O_3$ and $SiO_2$ layers.

3. A headlamp comprising
   a reflector and
   a lamp comprising a bulb that generates visible light and infrared light, wherein,
   the bulb is provided with a coating that reflects middle infrared radiation and is transparent to near infrared; and
   a lower reflector segment is provided with a coating which reflects near infrared radiation and which is transparent to visible light.

4. A lamp for night vision comprising
   first and second elliptical bulbs, the second bulb being external to and surrounding the first bulb;
   a first coating on the first bulb, which first coating comprises layers of $Nb_2O_5$ and $SiO_2$ arranged such that infrared radiation of wavelength greater than 1000 nm is substantially reflected and near infrared radiation in a range of 800 to 1000 nm is substantially transmitted; and
   a second coating on the second bulb, which second coating comprises layers of $Fe_2O_3$ and $SiO_2$ arranged so that visible light having a wavelength in the range of 400 to 800 nm is substantially blocked.

5. A vehicle headlight comprising the lamp of claim 4 and further comprising a reflector that reflects near infrared radiation and is transparent to visible light.

6. A lamp comprising a bulb that generates visible light and infrared light, the bulb being provided with a first coating that reflects middle infrared radiation and is transparent to near infrared radiation and being surrounded by an external bulb having a second coating that eliminates visible light, wherein the second coating comprises $Fe_2O_3$ and $SiO_2$ layers.

7. A lamp comprising a bulb that generates visible light and infrared light, the bulb being provided with a coating that reflects middle infrared radiation and is transparent to near infrared radiation, wherein the lamp is arranged for a night sight application.

8. A lamp comprising a bulb that generates visible light and infrared light, the bulb being provided with a coating that reflects middle infrared radiation and is transparent to near infrared radiation, wherein the coating is transparent for substantially all wavelengths in the range of 800 to 1000 nm.

* * * * *